(12) United States Patent
Yu et al.

(10) Patent No.: US 8,262,380 B2
(45) Date of Patent: Sep. 11, 2012

(54) INJECTION MOLD (75) Inventors: Tai-Cherng Yu, Taipei Hsien (TW);
Sheng-Jung Yu, Taipei Hsien (TW);
Chun-Yu Lin, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 121 days.

(21) Appl. No.: 12/821,139

(22) Filed: Jun. 23, 2010

(65) Prior Publication Data

US 2011/0097432 A1    Apr. 28, 2011

(30) Foreign Application Priority Data

Oct. 23, 2009    (CN) .......................... 2009 1 0308700

(51) Int. Cl.
*B29C 45/36* (2006.01)

(52) U.S. Cl. ............... 425/192 R; 425/468; 425/577; 425/808

(58) Field of Classification Search .......... 425/110, 425/112, 127, 129.1, 123, 121, 395, 397, 425/556, 571, 572, 577, 588, 589, 403, 414, 425/436 R, 436 RM, 573, 468, 470, 808, 425/190, 192 R, 195; 264/328.1, 328.9, 264/318, 334; 249/63, 64, 176
See application file for complete search history.

(56) References Cited

U.S. PATENT DOCUMENTS

| | | | | |
|---|---|---|---|---|
| 4,381,908 A * | 5/1983 | Roth | ................ | 425/129.1 |
| 4,470,786 A * | 9/1984 | Sano et al. | .................... | 425/125 |
| 5,073,326 A * | 12/1991 | Craves et al. | ................ | 264/278 |
| 5,269,998 A * | 12/1993 | Takagi et al. | ............... | 264/328.1 |
| 5,766,985 A * | 6/1998 | Mangiagli et al. | ............. | 438/121 |
| 5,985,185 A * | 11/1999 | Steijer et al. | .................... | 264/1.7 |
| 6,074,577 A * | 6/2000 | Katsura et al. | ............... | 264/1.25 |
| 6,129,881 A * | 10/2000 | Puniello | ........................ | 264/278 |
| 6,193,493 B1 * | 2/2001 | Steijer et al. | .................... | 425/116 |
| 6,262,480 B1 * | 7/2001 | Ferri et al. | ..................... | 257/706 |
| 6,428,732 B1 * | 8/2002 | Onoue et al. | .................. | 264/278 |
| 6,503,436 B1 * | 1/2003 | Koguchi et al. | ............... | 264/277 |
| 7,291,005 B2 * | 11/2007 | Yang et al. | ..................... | 425/556 |
| 7,412,130 B2 * | 8/2008 | Harness et al. | ................. | 385/31 |
| 7,442,032 B2 * | 10/2008 | Tu | ................................. | 425/556 |
| 8,118,580 B2 * | 2/2012 | Wu et al. | ........................ | 425/127 |
| 2002/0017732 A1 * | 2/2002 | Koyama et al. | .................. | 264/39 |
| 2002/0146480 A1 * | 10/2002 | Yamakawa et al. | ........... | 425/468 |
| 2003/0001297 A1 * | 1/2003 | Suematsu et al. | ............. | 264/1.25 |

(Continued)

FOREIGN PATENT DOCUMENTS

JP    61290022 A  * 12/1986

(Continued)

*Primary Examiner* — Dimple Bodawala
(74) *Attorney, Agent, or Firm* — Altis Law Grouop, Inc.

(57) ABSTRACT

An exemplary injection mold for manufacturing a fiber optic connector includes a first mold, a second mold, an insert, two first positioning bar, and four second positioning bars. The first mold and the second mold cooperatively define a mold cavity. The mold cavity includes two lens molding recesses. The two inserts are attached to the second mold and located in the mold cavity. A dimension of each second bar in cross section is substantially smaller than that of each first positioning bar. One first positioning bar and two second positioning bars are arranged around each insert to position the insert, such that the inserts is suspended in the mold cavity and precisely aligns with the respective molding recesses.

18 Claims, 6 Drawing Sheets

U.S. PATENT DOCUMENTS

| | | | |
|---|---|---|---|
| 2006/0263034 A1* | 11/2006 | Sakurai et al. | 385/147 |
| 2007/0090570 A1* | 4/2007 | Cochran et al. | 264/318 |
| 2007/0172539 A1* | 7/2007 | Wang et al. | 425/577 |
| 2011/0150393 A1* | 6/2011 | Lin | 385/53 |
| 2011/0156308 A1* | 6/2011 | Yu et al. | 264/278 |
| 2011/0158589 A1* | 6/2011 | Lin | 385/74 |
| 2011/0256254 A1* | 10/2011 | Yen | 425/123 |
| 2011/0262079 A1* | 10/2011 | Kato et al. | 385/78 |
| 2012/0058212 A1* | 3/2012 | Lin | 425/123 |
| 2012/0070530 A1* | 3/2012 | Gong et al. | 425/556 |

FOREIGN PATENT DOCUMENTS

| | | | |
|---|---|---|---|
| JP | 62261413 A | * | 11/1987 |
| JP | 63045035 A | * | 2/1988 |
| JP | 63179168 | * | 7/1988 |
| JP | 01209114 A | * | 8/1989 |
| JP | 04039015 A | * | 2/1992 |
| JP | 2001145941 A | * | 5/2001 |
| JP | 2003241019 A | * | 8/2003 |

* cited by examiner

INJECTION MOLD

CROSS-REFERENCE TO RELATED APPLICATION

This application is related to, and claims the benefit of, a foreign priority application filed in China as Application No. 200910308700.6 on Oct. 23, 2009. The related application is incorporated herein by reference.

BACKGROUND

1. Technical Field

The disclosure generally relates to injection molds, and particularly relates to an injection mold capable of positioning a number of inserts.

2. Description of Related Art

A fiber optic connector is used to couple optical fibers. Typically, the connector includes two opposite ends. One end of the connector is connected to a number of optical fibers, and the other end of the connector is connected to a number of converging lenses. Each of the converging lenses aligns with a corresponding optical fiber. To connect the fibers with the connector, a number of receiving holes are defined in the connector to fittingly receive the fibers. In operation, two connectors are provided and connected to each other, and optical signals are transmitted from one fiber to another through converging lenses of the connectors. Generally, the connectors are manufactured by injection molding. To manufacture a connector with the receiving holes, a number of inserts are provided in a mold cavity of an injection mold to displace areas of the cavity where holes or grooves should be in the final molded workpiece. However, precisely positioning inserts in the mold cavity is difficult and results in inferior quality products.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Embodiments will now be described in detail below, with reference to the drawings.

Figure 1:
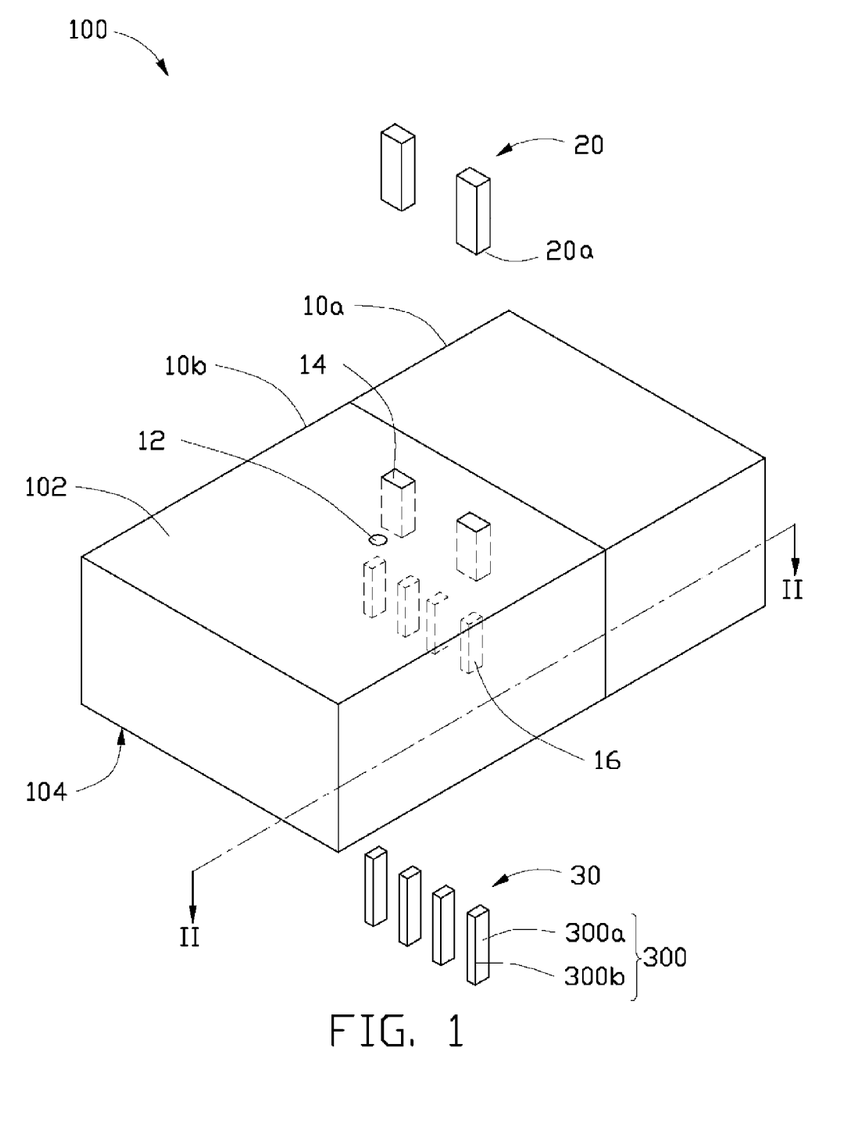
FIG. 1 is an isometric, exploded view of an injection mold in accordance with an exemplary embodiment.
Figure 2:
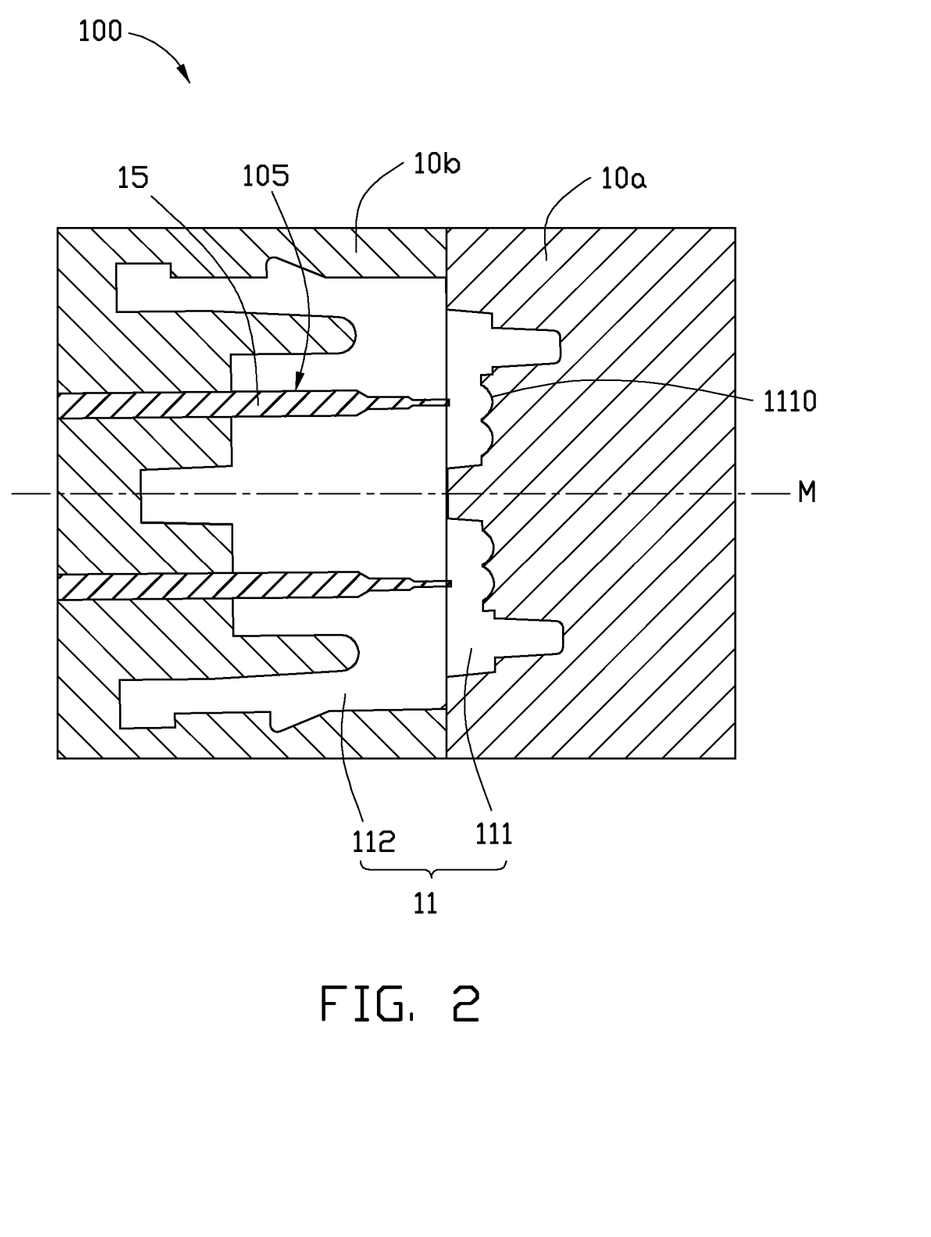
FIG. 2 is a cross-sectional view of the injection mold of FIG. 1, taken from line II-II.
Figure 3:
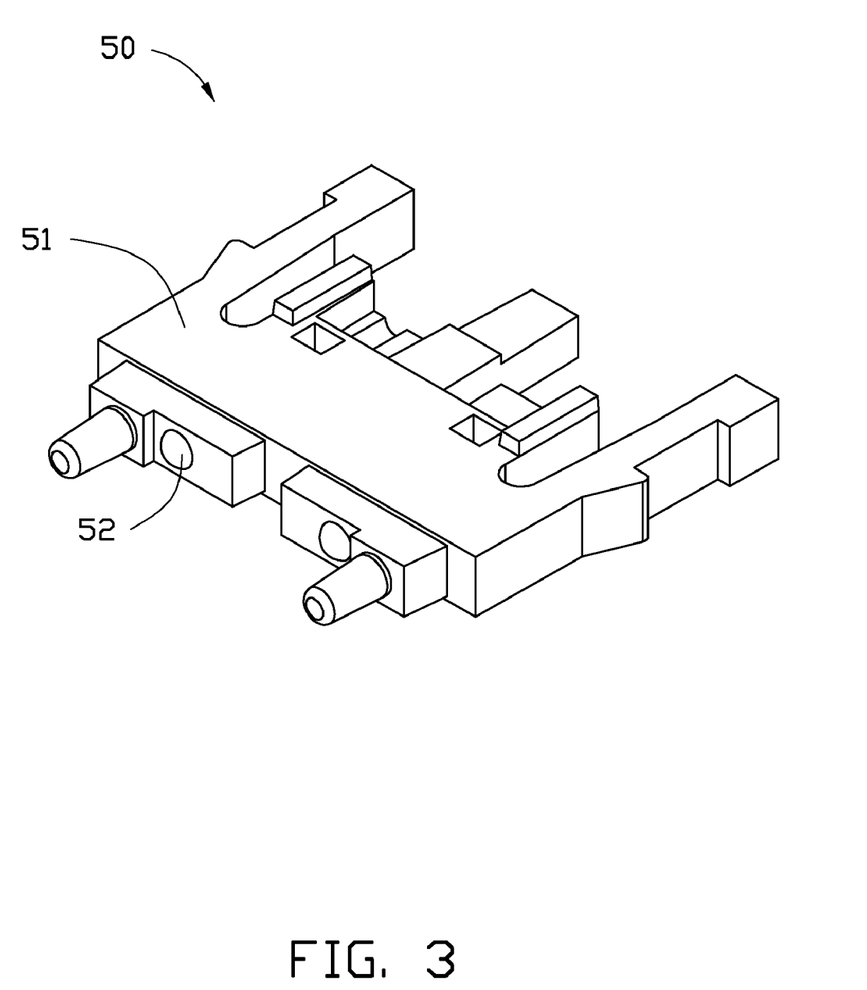
FIG. 3 is an isometric view of a fiber optic connector manufactured by applying the injection mold of FIG. 1.
Figure 4:
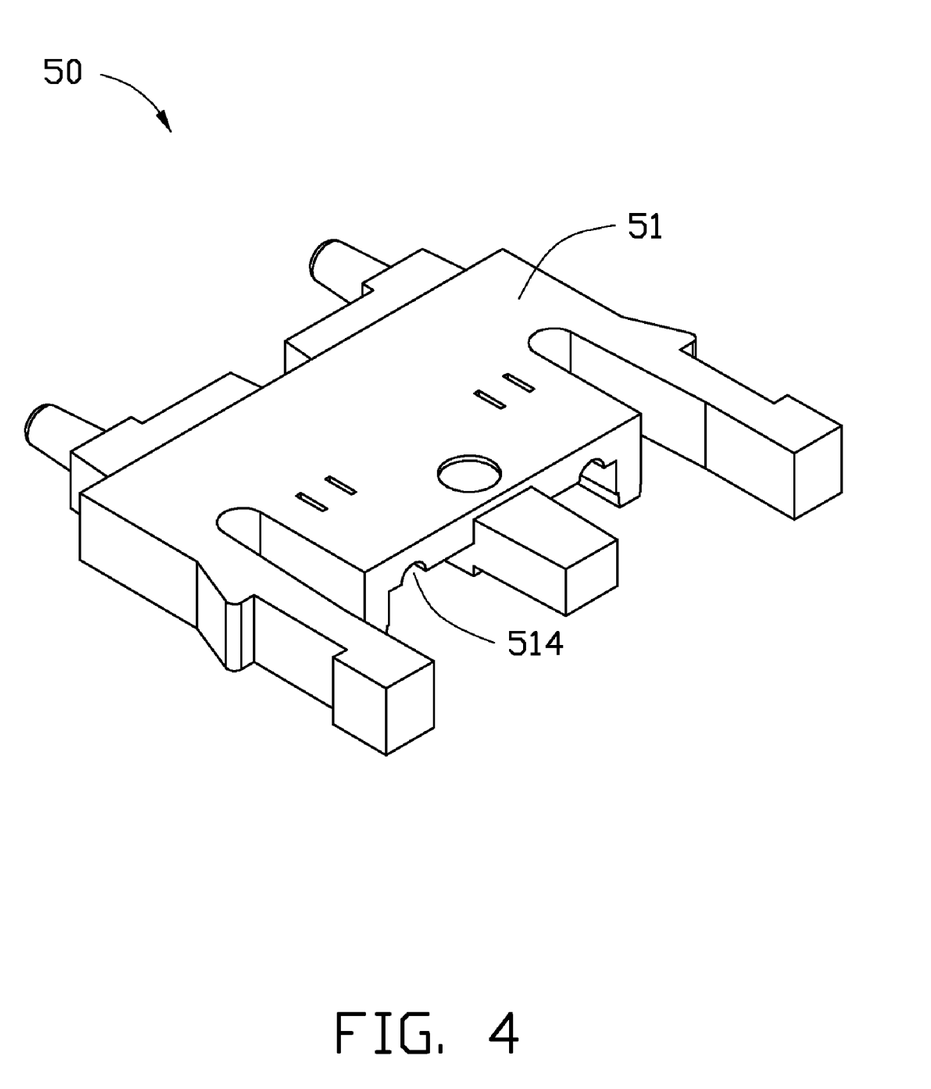
FIG. 4 is an isometric view of the fiber optic connector of FIG. 3, as viewed from another perspective.

Referring to FIGS. 1 and 2, an injection mold 100 in accordance with an exemplary embodiment, includes a first mold 10a, a second mold 10b, two inserts 15, two first positioning bars 20, and four second positioning bars 30. The injection mold 100 is configured to manufacture a fiber optic connector 50, as shown in FIGS. 3 and 4. The connector 50 mainly includes a main body 51 and two converging lenses 52 (see FIG. 3). The main body 51 has two receiving holes 514 (see FIG. 4) defined therein for receiving two conventional optical fibers (not shown) respectively. The two converging lenses 52 each align with a corresponding receiving hole 514.

As shown in FIG. 2, the first mold 10a and the second mold 10b cooperatively define a mold cavity 11. The mold cavity 11 defines a central axis M, and includes a first cavity 111 in the first mold 10a and a second cavity 112 in the second mold 10b. The first cavity 111 includes two lens molding recesses 1110 located at two opposite sides of the central axis M. The two lens molding recesses 1110 are configured to mold the two converging lens 52 of the connector 50. In particular, the two lens molding recesses 1110 are symmetrically opposite to each other across the central axis M.

The two inserts 15 are configured to mold the two receiving holes 514 of the connector 50. In this embodiment, the two inserts 15 are attached to the second mold 10b and align with the lens molding recesses 1110 respectively. In such case, each of the receiving holes 514 molded aligns with a corresponding converging lens 52. In particular, the two inserts 15 are arranged at two opposite sides of the central axis M, and are symmetrically opposite to each other across the central axis M. The two inserts 15 are elongated and parallel with each other. Each insert 15 has a generally cylindrical shape, and includes a circular lateral surface 105. In alternative embodiments, the insert 15 can be cuboid-shaped, or the insert 15 may have another suitable shape, for example, a generally conical shape or a generally pyramidal shape.

The first mold 10a and the second mold 10b each is substantially rectangular, The second mold 10b includes a first surface 102 and a second surface 104 at two opposite sides thereof. In this embodiment, the second mold 10b has a gate 12 and two first positioning holes 14 defined in the first surface 102, and four second positioning holes 16 defined in the second surface 104. Each of the gate 12, the first positioning holes 14, and the second positioning holes 16 communicates with the mold cavity 11.

Figure 5:
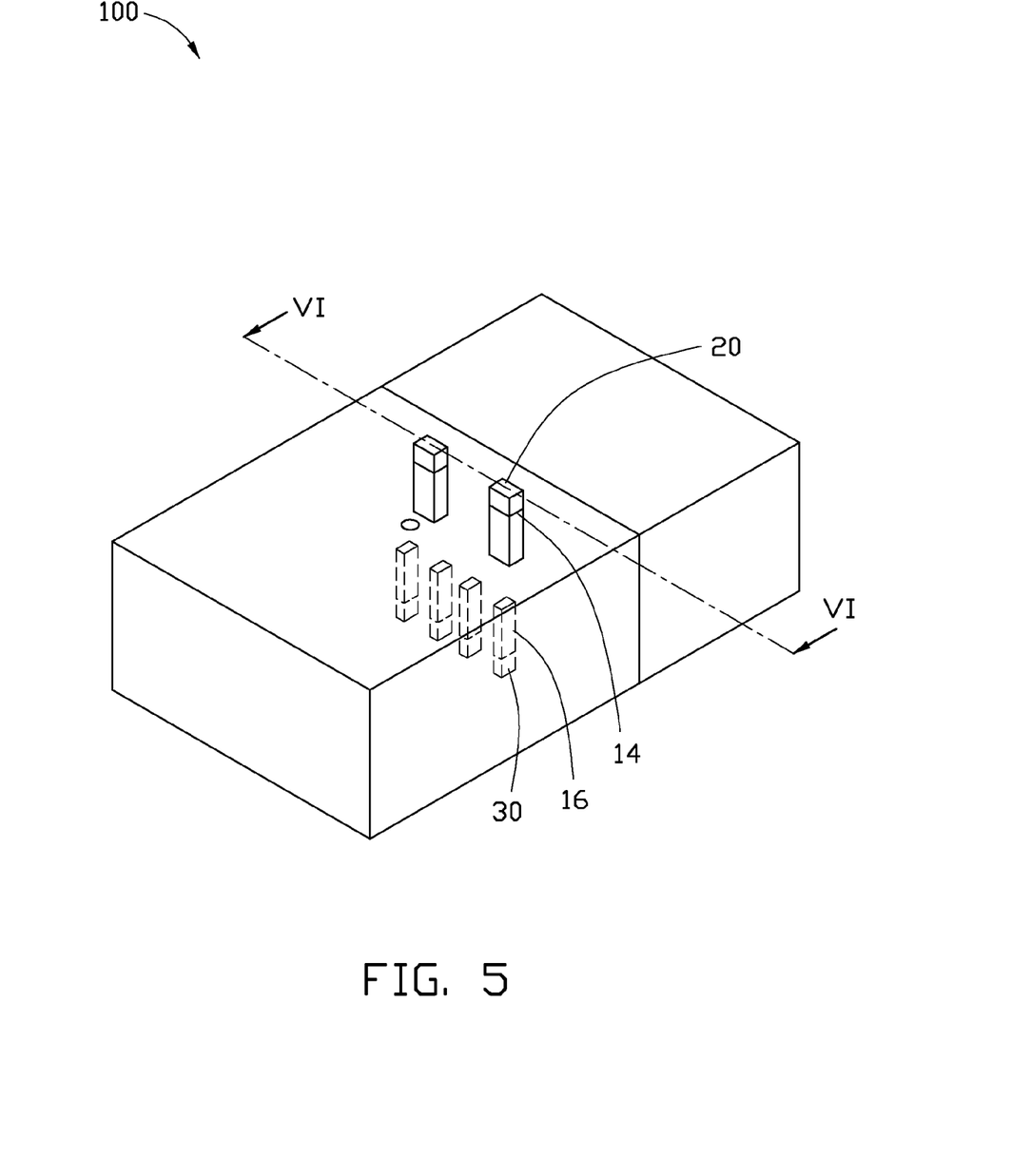
FIG. 5 is an assembled view of the injection mold of FIG. 1.
Figure 6:
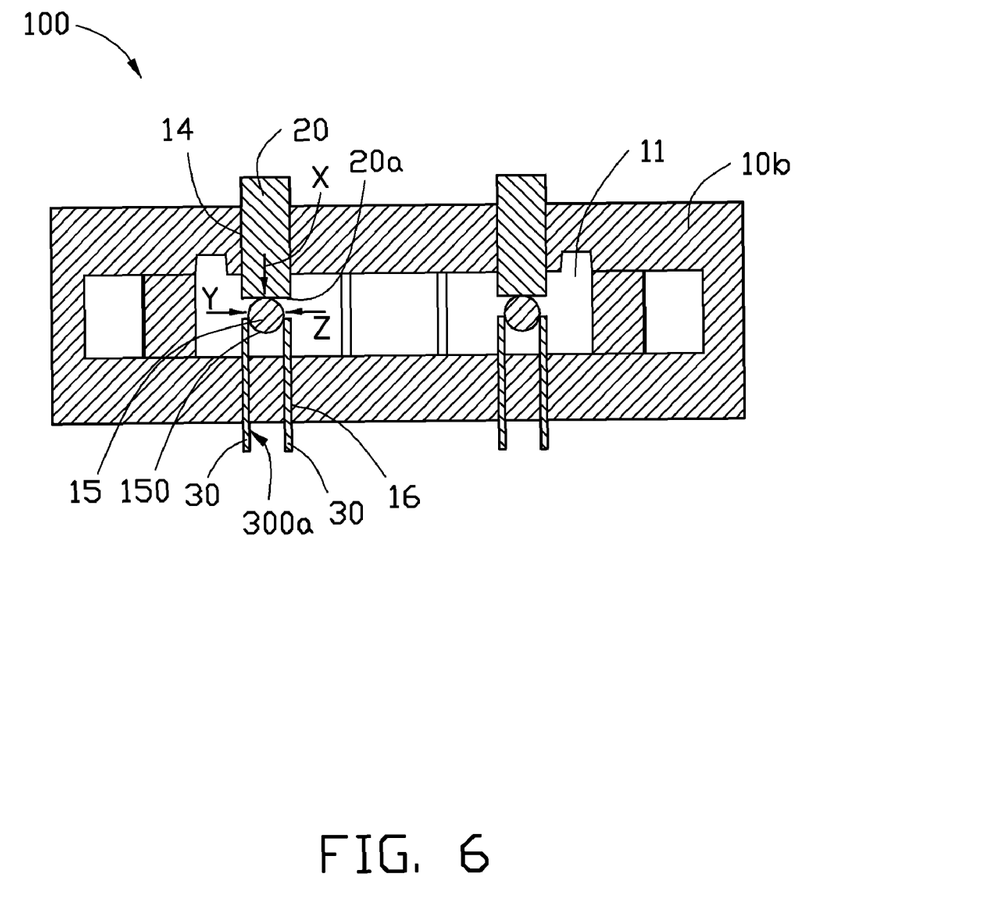
FIG. 6 is a cross-sectional view of the injection mold of FIG. 5, taken from line VI-VI.

Referring also to FIGS. 5-6, the injection mold 100 is assembled by inserting the first positioning bars 20 and the second positioning bars 30 into the first and the second positioning holes 14, 16 to position the inserts 15. The first positioning bar 20 is elongated and includes a bottom surface 20a perpendicular to a lengthwise direction thereof. The bottom surface 20a is a flat surface. A cross-section of the first positioning bar 20 is substantially rectangular. Each of the two second positioning bars 30 is elongated and includes a peripheral surface 300. A cross-section of the first positioning bar 20 is substantially rectangular. The peripheral surface 300 includes two parallel first flat peripheral surfaces 300a and two parallel second flat peripheral surfaces 300b. Each of the first flat peripheral surfaces 300a is located between and adjoins the two second flat peripheral surfaces 300b (see FIG. 1). In this embodiment, the first positioning bar 20 has a larger diameter in cross section than the second positioning bar 30 (see FIG. 6). In positioning the inserts 15, each insert 15 is surrounded by a first positioning bar 20 and two neighboring second positioning bars 30. The bottom surface 20a of the first positioning bar 20 and the first flat peripheral surfaces 300a of the two second positioning bars 30 contact the lateral surface 105 of the insert 15, as shown in FIG. 6. The first positioning bar 20 abuts against the insert 15 in a first direction X. The two second positioning bars 30 abut against the insert 15 in a second direction Y and a third direction Z. Thus, the insert 15 is precisely positioned in the mold cavity 11, and each of the inserts 15 precisely aligns with a corresponding lens molding recess 1110. In particular, the first positioning bar 20 and the second positioning bars 30 are located on a common plane substantially perpendicular to a lengthwise direction of the insert 15. In this embodiment, the insert 15 is positioned with the first positioning bar 20 and the second positioning bars 30 being perpendicular to the insert 15. The first and the two second positioning bars 20, 30 are parallel with one another. The first, the second, and the third directions X, Y, Z each point to a center of the insert 15. In alternative embodiments, any one of the first positioning bar 20 and the second positioning bars 30 may have another suitable shape, such as a cylindrical shape. In other alternative embodiments, the number of inserts 15 can be only one or more than two, for example four, six, eight, etc., depending on actual needs. Accordingly, the number of first and second positioning bars 20, 30 also depends on actual needs.

The first positioning holes 14 each are configured to guide the corresponding first positioning bar 20 into the mold cavity 11. In this embodiment, a dimension of the first positioning hole 14 is substantially same as that of the corresponding first positioning bar 20. The first positioning hole 14 fittingly receives the corresponding first positioning bar 20 when the insert 15 is positioned in the mold cavity 11. The second positioning holes 16 each are configured to guide the corresponding second positioning bar 30 into the mold cavity 11. Dimensions of the second positioning holes 16 are substantially same as that of the respective second positioning bar 30. Thus, each second positioning hole 16 fittingly receives the corresponding second positioning bar 30 when the insert 15 is positioned. Either of the first and the second positioning holes 14, 16 can be round or rectangular.

In operation of the injection mold 100, plastic is heated and injected into the mold cavity 11 through the gate 12. The inserts 15 displace plastic where the receiving holes 514 of the connector 50 are to be formed when the plastic is cooled and hardened, and then the formed connector is removed from the mold cavity 11. In this embodiment, the connector 50 is manufactured as a whole. That is, the main body 51 and the two converging lenses 52 are integrally formed.

One advantage of the injection mold 100 is that the insert 15 is equipped with the first positioning bar 20 and the second positioning bars 30 to precisely position the inserts 15. Thus the optical fiber connectors manufactured using the injection mold 100 can be used to precisely transmit optical signal. Another advantage yielded by the injection mold 100 is that the second positioning bars 30 has relatively small dimension. Thus, plastic can flow in the mold cavity 11 with relatively less resistant. The plastic can fill the entire mold cavity 11 quickly.

It is to be understood that the above-described embodiment is intended to illustrate rather than limit the disclosure. Variations may be made to the embodiment without departing from the spirit of the disclosure as claimed. The above-described embodiments illustrate the scope of the disclosure but do not restrict the scope of the disclosure.

What is claimed is:

1. An injection mold for manufacturing a fiber optic connector, the connector including at least one converging lens and at least one receiving hole for receiving an optical fiber, each of the at least one receiving hole being aligned with a corresponding one of the at least one converging lens, the injection mold comprising:
   a first mold and a second mold cooperatively defining a mold cavity, the mold cavity comprising at least one lens molding recess configured for molding the at least one converging lens;
   at least one insert attached to the second mold and located in the mold cavity and configured for molding the at least one receiving hole; and
   at least one first positioning bar and at least two neighboring second positioning bars, a dimension of each second positioning bar in cross section being substantially smaller than a dimension of the at least one first positioning bar, and the at least one first positioning bar and the at least two second neighboring positioning bars being arranged around the at least one insert to position the at least one insert, such that the at least one insert is suspended in the mold cavity and aligns with the at least one lens molding recess;
   wherein each of the at least one first positioning bar comprises a flat bottom surface perpendicular to a lengthwise direction of the first positioning bar, each of the at least two neighboring second positioning bars is positioned parallel to a corresponding one of the at least one first positioning bar and comprises a peripheral surface, and the two peripheral surfaces of two second positioning bars neighboring the corresponding first positioning bar have two opposite peripheral surface portions parallel to the lengthwise direction; and
   a combination of one first positioning bar and two corresponding neighboring second positioning bars is configured to position one of the at least one insert, wherein in each combination, the flat bottom surface of the first positioning bar cooperating with the two opposite peripheral surface portions of the two second positioning bars is configured to abut against a corresponding one of the at least one insert, so as to position the corresponding insert.

2. The injection mold of claim 1, wherein in each combination, the first positioning bar and the two second positioning bars are located on a common plane substantially perpendicular to a lengthwise direction of the corresponding insert.

3. The injection mold of claim 2, wherein in each combination, each of the first positioning bar and the two second positioning bars is substantially perpendicular to a lateral surface of the corresponding insert.

4. The injection mold of claim 1, wherein a cross-section of each first positioning bar is generally rectangular or each first positioning bar is generally cylindrical.

5. The injection mold of claim 1, wherein the second mold has at least one first positioning hole defined at one side thereof, and at least two second positioning holes defined at an opposite side thereof, the at least one first positioning hole and the at least two second positioning holes each communicate with the mold cavity, the at least one first positioning hole is configured for guiding the at least one first positioning bar to be inserted into the mold cavity, and the at least two second positioning holes are configured for guiding insertion of the at least two second positioning bars into the mold cavity.

6. The injection mold of claim 5, wherein a dimension of the at least one first positioning hole in cross section is substantially same as a dimension of the corresponding at least one first positioning bar in cross section, and dimensions of the at least two second positioning holes in cross section are substantially same as dimensions of the corresponding at least two second positioning bars in cross section.

7. The injection mold of claim 1, wherein the at least one first positioning bar and the at least two second positioning bars are all parallel with one another.

8. The injection mold of claim 4, wherein the mold cavity defines a central axis, and the at least one lens molding recess comprises two lens molding recesses that are symmetrically opposite to each other across the central axis.

9. The injection mold of claim 1, wherein each of the at least one insert is generally cylindrical.

10. An injection mold for manufacturing a fiber optic connector, the connector including at least one converging lens and at least one receiving hole for receiving an optical fiber, each of the at least one receiving hole being aligned with a corresponding one of the at least one converging lens, the injection mold comprising:
a first mold and a second mold cooperatively defining a mold cavity, the mold cavity comprising at least one lens molding recess configured for molding the at least one converging lens;
at least one insert attached to the second mold and located in the mold cavity configured for molding the at least one receiving hole; and
at least one elongated first positioning bar and at least two neighboring elongated second positioning bars having flat bottom surface and penetrating through the second mold to enter the mold cavity, the at least one elongated first positioning bar extending through one of two opposite outer surfaces of the second mold and the at least two second positioning bars extending through the other one of the two opposite outer surfaces of the second mold;
wherein a combination of one first positioning bar and two corresponding neighboring second positioning bars is configured to position a corresponding one of the at least one insert; and
in each combination, the two second positioning bars are arranged parallel to the first positioning bar and opposite to each other, the first positioning bar abuts against a lateral surface of the corresponding insert in a first direction along a lengthwise direction of the first positioning bar, and the two second positioning bars sandwich the corresponding insert along a direction substantially perpendicular to the first direction.

11. The injection mold of claim 10, wherein in each combination, a dimension of the first positioning bar in cross section is greater than a dimension of each second positioning bar in cross section.

12. The injection mold of claim 11, wherein in each combination, each of the first positioning bar and the two second positioning bars is substantially perpendicular to the lateral surface of the corresponding insert.

13. The injection mold of claim 11, wherein a cross-section of each first positioning bar is generally rectangular or each first positioning bar is generally cylindrical.

14. The injection mold of claim 11, wherein the second mold has at least one first positioning hole defined at one side thereof, and at least two second positioning holes defined at an opposite side thereof, the at least one first positioning hole and the at least two second positioning holes each communicate with the mold cavity, the at least one first positioning hole is configured for guiding the at least one first positioning bar to be inserted into the mold cavity, and the at least two second positioning holes are configured for guiding insertion of the at least two second positioning bars into the mold cavity.

15. The injection mold of claim 14, wherein a dimension of the at least one first positioning hole in cross section is substantially same as a dimension of the corresponding at least one first positioning bar in cross section, and dimensions of the at least two second positioning holes in cross section are substantially same as dimensions of the corresponding at least two second positioning bars in cross section.

16. The injection mold of claim 11, wherein the at least one first positioning bar and the at least two second positioning bars are all parallel with one another.

17. The injection mold of claim 11, wherein the mold cavity defines a central axis, and the at least one lens molding recess comprises two lens molding recesses that are symmetrically opposite to each other across the central axis.

18. The injection mold of claim 11, wherein the lateral surface of the corresponding insert is shaped as a cylindrical lateral surface.

* * * * *